(12) United States Patent
Sutehall et al.

(10) Patent No.: US 6,344,614 B1
(45) Date of Patent: Feb. 5, 2002

(54) LIMITING ELECTRICAL DEGRADATION OF ALL-DIELECTRIC SELF SUPPORTING CABLES

(75) Inventors: Ralph Sutehall, Abertillery; Ian Dewi Lang, Newport, both of (GB)

(73) Assignee: Pirelli General plc, London (GB)

( * ) Notice: Subject to any disclaimer, the term of this patent is extended or adjusted under 35 U.S.C. 154(b) by 0 days.

(21) Appl. No.: 09/178,635

(22) Filed: Oct. 26, 1998

(30) Foreign Application Priority Data

Oct. 27, 1997 (GB) .............................. 9722676

(51) Int. Cl.[7] .......................... H02G 15/02; H01R 4/00
(52) U.S. Cl. ...................... 174/74 R; 174/78; 174/84 C
(58) Field of Search ........................... 174/78, 84 C, 174/79, 40 CC, 40 TD, 41, 45 R, 44, 70 A, 74 R

(56) References Cited

U.S. PATENT DOCUMENTS

| | | | |
|---|---|---|---|
| 2,473,965 A | * 6/1949 | Morrison et al. ............. | 174/70 |
| 3,207,836 A | * 9/1965 | Slechata ...................... | 174/41 |
| 3,267,201 A | * 8/1966 | Pusey et al. .................. | 174/41 |
| 3,297,814 A | * 1/1967 | McClean et al. ............. | 174/41 |
| 4,467,387 A | * 8/1984 | Bergh et al. ................. | 361/132 |
| 4,495,381 A | * 1/1985 | Timoshenko et al. ........ | 174/178 |
| 4,531,018 A | * 7/1985 | Huster ..................... | 174/140 R |
| 5,043,037 A | * 8/1991 | Buckland .................... | 156/166 |
| 5,095,176 A | * 3/1992 | Harbrecht et al. ......... | 174/23 R |
| 5,526,457 A | * 6/1996 | Rowland et al. ............ | 385/101 |
| 5,606,636 A | * 2/1997 | Rowland et al. ............ | 385/101 |
| 5,678,609 A | * 10/1997 | Washburn ................... | 138/107 |
| 5,789,701 A | * 8/1998 | Wettengel et al. ............ | 174/41 |
| 5,867,624 A | * 2/1999 | Forrester et al. ............ | 385/134 |

* cited by examiner

Primary Examiner—Dean A. Reichard
Assistant Examiner—William H. Mayo, III
(74) Attorney, Agent, or Firm—Finnegan, Henderson, Farabow, Garrett & Dunner, L.L.P.

(57) ABSTRACT

An assembly for use adjacent an earthed suspension region 20 of an all-dielectric self-supporting cable 10 suspended in an electric field at the earthed suspension region from a tower or the like for limiting dry band arcing adjacent the earthed suspension region is disclosed. The assembly includes an electrically conductive device 21 clamped to the cable remote from the earthed suspension region 20 and structure defining a current path having an arc gap connected between the device 21 and the earthed region 20.

11 Claims, 4 Drawing Sheets

LIMITING ELECTRICAL DEGRADATION OF ALL-DIELECTRIC SELF SUPPORTING CABLES

FIELD OF INVENTION

This invention relates to limiting electrical degradation of all-dielectric self-supporting (ADSS) cables.

DESCRIPTION OF RELATED ART

When ADSS cables are suspended from towers from which power transmission lines are also suspended, they can suffer from electrical degradation caused by dry band arcing.

Dry band arcing arises since there is an induced voltage gradient along the length of the ADSS cable. This voltage gradient does not present a problem if the cable is dry. When the cable surface becomes electrically conductive due to moisture, however, a current is drawn along the length of the cable. This current is greatest at the tower where the cable is suspended and at earth potential and will dry the cable surface leading to a break in the previously continuously electrically conductive surface. This break can extend around the cable to form a dry band and arcing across the dry band can degrade the cable.

An object of this invention is to limit such dry band arcing adjacent the earthed suspension regions of ADSS cables.

Briefly this is achieved by providing a current path between a location on the cable remote from the earthed suspension region thereof and the earthed region which current path includes an arc gap (or an equivalent thereto) such that current will flow along this path rather than along the surface of the cable between the location and the earthed suspension region when dry band arcing at a current above a predetermined value would otherwise occur.

SUMMARY OF THE INVENTION

In one aspect, the invention provides an assembly for use adjacent an earthed suspension region of an all-dielectric self-supporting cable suspended in an electric field at said region from a tower or the like for limiting dry band arcing adjacent said region, said assembly comprising an electrically conductive device connectable to said cable remote from said region and means for defining a current path having an arc gap or equivalent solid state device connectable between said device and said earthed region.

The current path defining means may include an electrically conductive clamp means clampable to said earthed region.

The device may comprise a clamping means clampable to said cable.

The arc gap is advantageously defined between an electrically conductive annular first member and an electrically conductive second member positioned at the axis thereof Preferably insulating means locate said second member relative to said first member.

The annular first member may be located adjacent the clamp means or the clamping means, or anywhere between the two.

In the embodiment of the invention described hereinafter the annular first member is located adjacent the clamping means and the second member comprises an elongate member extending from the clamp means to the annular first member.

If, however, the annular first member is located adjacent the clamp means the second member may comprise an elongate member extending from the clamping means to the annular first member.

The invention also includes an installation comprising an all-dielectric self-supporting cable suspended at an earthed suspension region thereof in an electric field from a tower or the like, wherein an electrically conductive device is connected to said cable remote from said region and means defining a current path having an arc gap or equivalent solid state device is provided between said device and said earthed region.

The invention also includes a method of limiting dry band arcing adjacent an earthed suspension region of an all-dielectric self-supporting cable suspended at said region from a tower or the like comprising directing current along a current path including an arc gap or an equivalent solid state device rather than along the surface of the cable when dry band arcing at a current above a predetermined value would otherwise occur.

The invention also includes a device comprising an electrically conductive annular first member and an electrically conductive second member positioned at the axis thereof such that an arc gap is defined between the internal surface of the first member and the external surface of the second member.

BRIEF DESCRIPTION OF THE DRAWINGS

In order that the invention may be well understood, the above-mentioned embodiment thereof which is given by way of example only will now be described with reference to the accompanying drawings, in which.

DETAILED DESCRIPTION OF THE INVENTION

Figure 1:
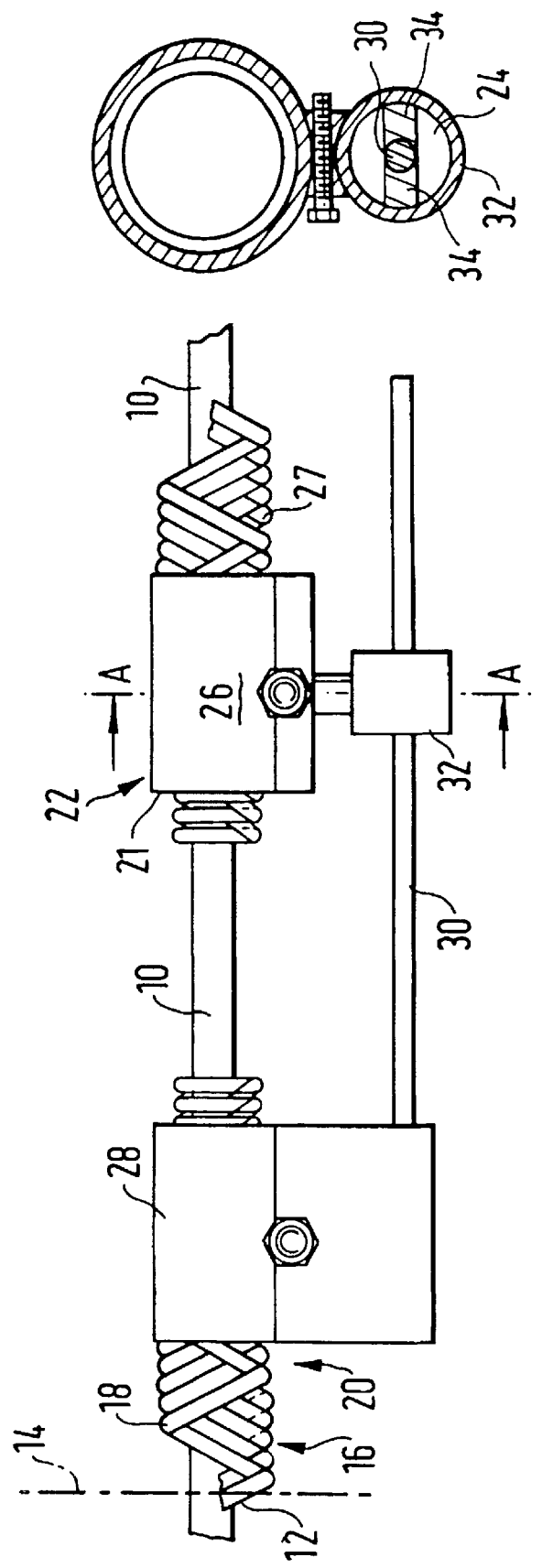
FIG. 1 schematically illustrates part of an installation including an assembly embodying the invention.

Referring first to FIG. 1 there is shown a portion of an all-dielectric self-supporting cable 10 disposed to one side of a location 12 on the cable at which the cable is supported by means of a suspension device (indicated by chain dotted line) 14 attached to a tower (not shown) from which a power transmission cable (not shown) is also suspended. The arrangement to the other (left hand as viewed in FIG. 1) side of the location 12 is substantially the same.

The cable 10 is provided with mechanical reinforcement 16 which is formed by one or more helically wound metallic members 18 and which extends to each side of the above-mentioned location 12. This reinforcement 16 is provided to spread the load imposed by the suspension device 14 on the cable and is at earth potential providing an earthed suspension region 20 of the cable.

This gives rise to the dry band arcing problem adjacent the earthed suspension region 20 of the cable discussed above. In order to limit dry band arcing adjacent the earthed suspension region 20 of the cable, a current path is provided between an electrically conductive device 21 connected to the cable at a location 22 on the cable remote from the earthed suspension region 20 and that region 20. This current path includes an arc gap 24 such that current will flow along this path rather than alone the surface of the cable 10 between the location 22 and the earthed suspension region 20 when dry band arcing at a current above a predetermined value (for example 1 mA) would otherwise occur on the cable surface between location 22 and region 20.

The electrically conductive device 21 as shown comprises a clamping means 26 which is clampable to the cable at location 22. As illustrated mechanical reinforcement 27 comprising one or more helically wound metallic members is provided between the clamping means 26 and cable, but this may be omitted.

Figure 2:
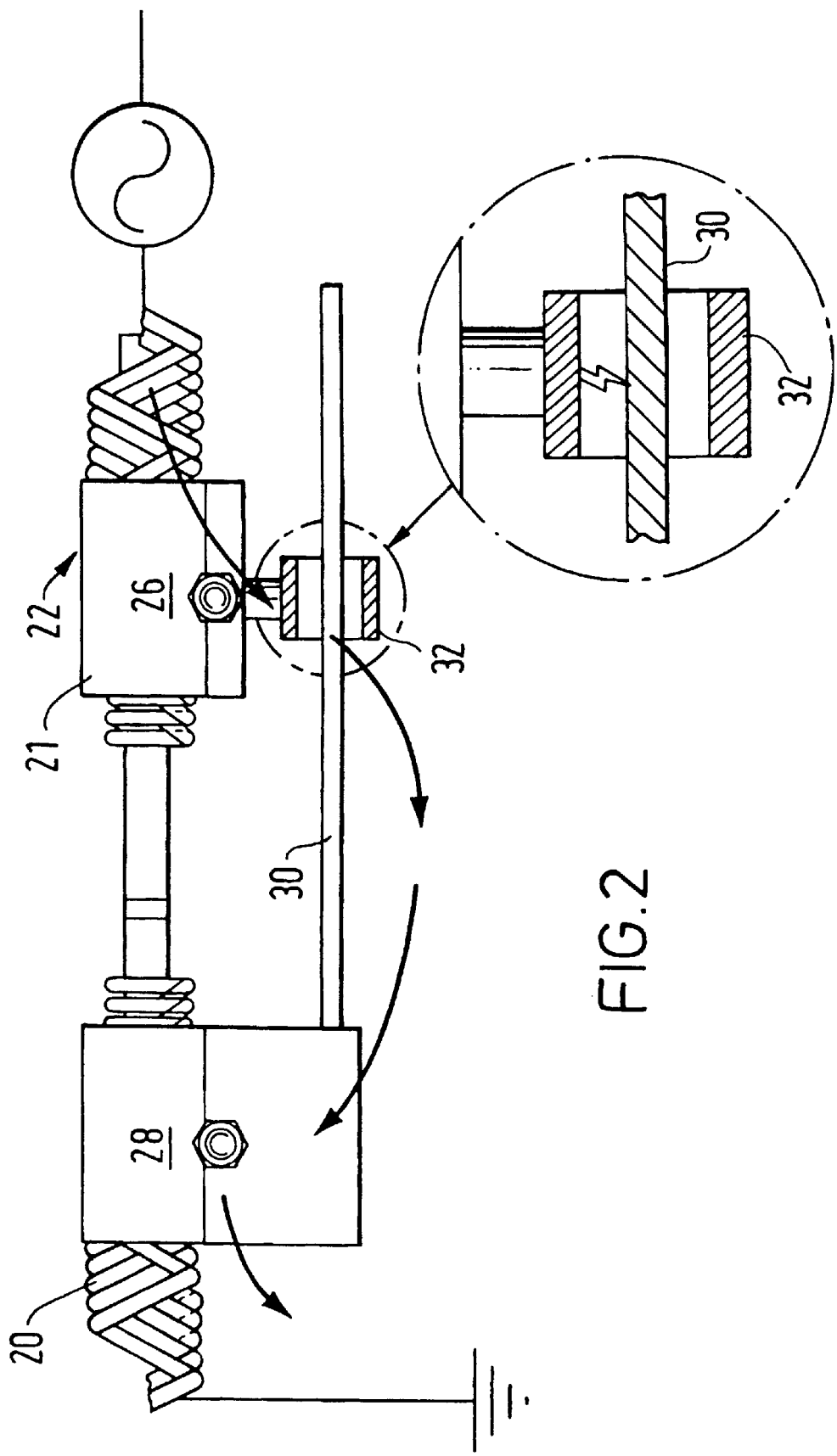
FIG. 2 schematically illustrates operation of the assembly.

As better shown in FIG. 2 the current path between the device 21 and earthed region 20 is defined by (i) a clamp means 28 which is clamped to the mechanical reinforcement 16 at the earthed region 20; (ii) an elongate electrically conductive member 30, for example a rod, which extends from the clamp means 28 substantially parallel to the cable 10; and (iii) an electrically conductive annular member 32, shown as a tubular sleeve, located adjacent, and electrically connected, to the clamping means 26.

The rod 30 is positioned at the axis of the sleeve 32 and an arc gap is defined between the internal surface of the sleeve and the external surface of the portion of the rod disposed within the sleeve. Typically this arc gap is about 4 mm.

Insulating arms 34 within the sleeve locate the rod centrally relative to the sleeve and as illustrated the rod may extend through and beyond the sleeve although this is not necessary. The extra length of rod beyond the sleeve in the illustrated assembly enables the position of the clamping means 26 to be further away from the earthed region 20. Typically though the clamping means will be about 1 m from the earthed region 20. The arms 34 are circumferentially spaced aperture and extend radially between the sleeve and rod. In the illustrated embodiment, two arms are used.

It is to be understood that the arc gap may be positioned anywhere along the current path between the device 21 and the earthed region 20. Thus, for example instead of locating the sleeve 32 adjacent the clamping means 26 and have the rod extend from the clamp means 28 to the sleeve as illustrated, the sleeve may be located adjacent the clamp means 28 with the rod extending from the clamping means 26 to the sleeve. In other words the position of the clamp and clamping means may be switched.

Operation of the assembly will now be described with particular reference to FIGS. 3a–c and 4a–b.

Firstly, it will be appreciated that if the surface of the cable 10 is dry no current will flow long its length. If, however, the cable surface becomes wet current will flow towards the earthed suspension region 20 because of the voltage gradient. This is illustrated in FIG. 3a where the electric field due to adjacent power cables (not shown) is indicated as 20 kV.

Figure 3A:
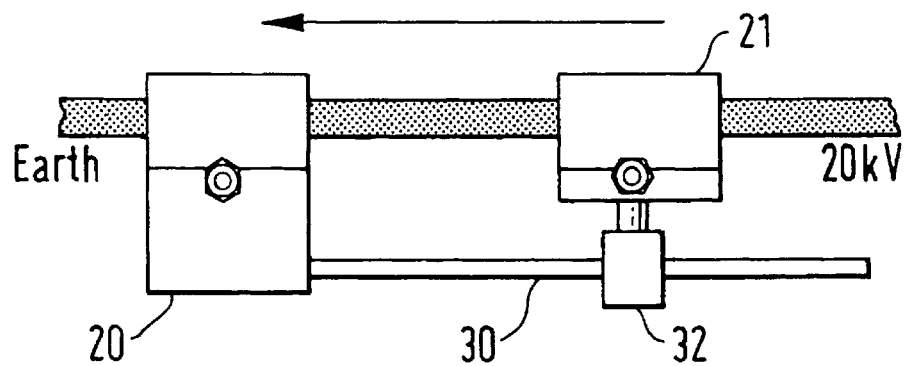
FIGS. 3a–c and 4a–b further illustrate operation of the assembly under different conditions.
Figure 3B:
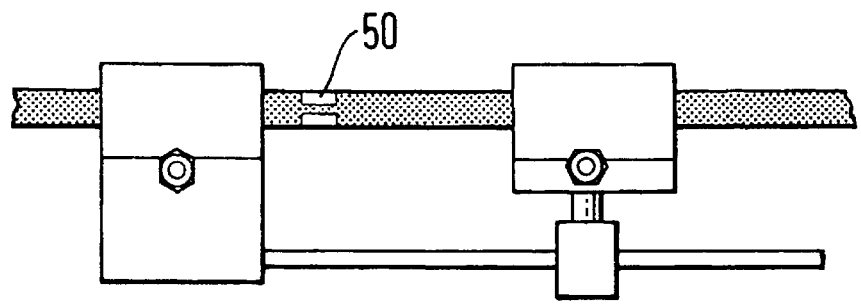
Figure 3C:
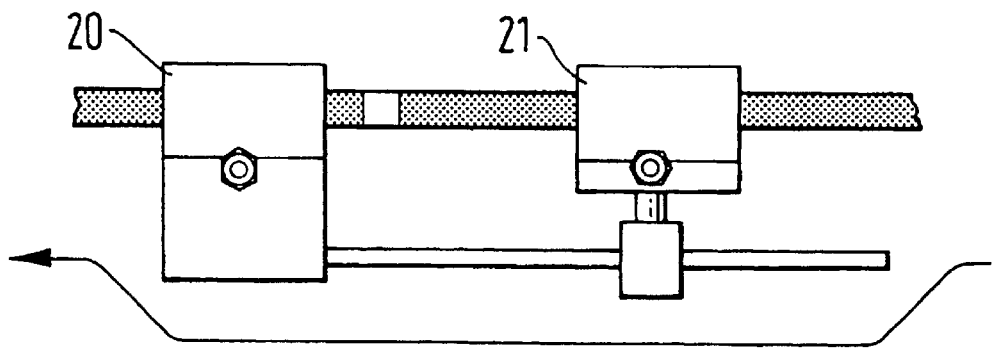

The current is highest adjacent the earthed region and causes drying of the wet cable surface such that a dry band may start to form about the cable surface in the portion of the cable between the earthed region and device 21 as illustrated at 50 in FIG. 3b. As the dry band forms, the resistance of the wet conductive film on the surface increases. After the dry band has formed it may increase in size and when arcing would otherwise occur at a current above a predetermined amount (eg 1 mA) which would degrade the cable surface, the current is directed, as illustrated in FIGS. 2 and 3c, along the current path between the device 21 and the earthed region 20 which includes the arc gap defined between the rod and the sleeve. As will be understood the size of the arc gap is selected to cause current flow long the current path between the device 21 and earthed region 20 rather than along the cable surface when arcing activity across the dry band would exceed the above-mentioned predetermined current.

Figure 4A:
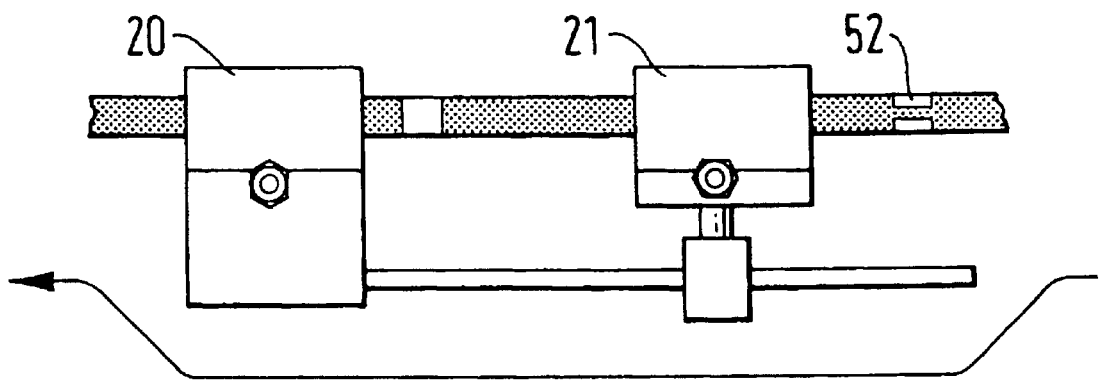
Figure 4B:
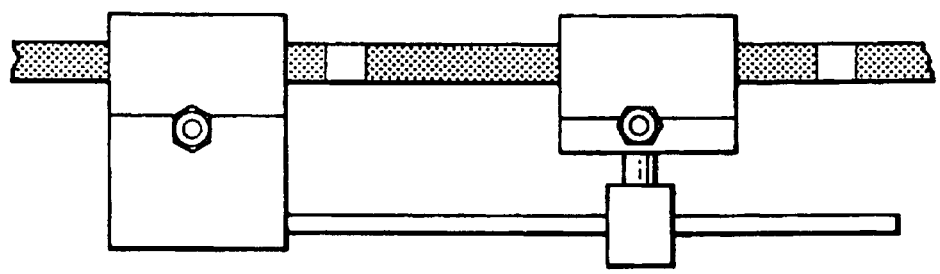

A secondary dry band may subsequently start to form on the cable adjacent the end of the device 21 remote from the earthed region 20 as illustrated in FIG. 4a at 52. In this case current flow is along the conductive path between the device 21 and region 20 as before as illustrated in FIG. 4a until such time as the secondary dry band is formed, when the combined resistance of this dry band and the already provided conductive breaks (the first dry band and the arc gap) prevents current flow as indicated in FIG. 4b.

Although FIGS. 3A–C indicate an electric field of 20 kV, it is envisaged that the embodiment will typically be used in fields of 10 kV and above.

It will be appreciated that the embodiment does not insulate the cable but instead acts to limit arcing activity on the cable surface when the arcing current reaches a predetermined value, for example 1 mA.

Although the embodiment uses an arc gap in the current path an equivalent solid state device, for example a varistor, could be provided instead to perform the same function as the arc gap.

It will also be appreciated that the sleeve-rod-insulator arrangement for providing the arc gap is such that the gap is automatically set to a desired value on assembly and does not change due to alignment variation over time. It is envisaged that this arrangement will have other applications, for example in covered conductors, transformers or any other application which uses traditional arcing horns instead of such arcing horns.

What is claimed is:

1. An assembly for use adjacent an earthed suspension region of an all-dielectric self-supporting cable suspended in an electric filed at said region from a tower for limiting dry band arcing adjacent said region, said assembly comprising an electrically conductive device connectable to said cable remote from said region and means for defining a current path having an arc gap connectable between said device and said earthed region, wherein said arc gap is defined between an electrically conductive annular first member and an electrically conductive elongated second member.

2. An assembly as claimed in claim 1, wherein said current path defining means includes an electrically conductive clamp means clampable to said earthed region.

3. An assembly as claimed in claim 1 or 2, wherein said device comprises a clamping means clampable to said cable.

4. An assembly as in claim 1, wherein insulating means locate said second member relative to said first member.

5. An assembly as in claim 1, wherein said current path defining means includes an electrically conductive clamp means clampable to said earthed region and wherein said annular first member is located adjacent said clamp means.

6. An assembly as claimed in claim 5, wherein said device comprises a clamping means clampable to said cable and wherein said second member comprises an elongate member extending from said clamping means to said annular first member.

7. An assembly as claimed in claim 1, wherein said device comprises a clamping means clampable to said cable and wherein said annular first member is located adjacent said clamping means.

8. An assembly as claimed in claim 7, wherein said current path defining means includes an electrically conductive clamp means clampable to said earthed region and wherein said second member comprises an elongate member extending from said clamp means to said annular first member.

9. An installation comprising an all-dielectric self-supporting cable suspended at an earthed region thereof in an electric field from a tower having an assembly adjacent said earthed region, said assembly being as defined in claims 1, 2, or 4–8 inclusive.

10. An installation comprising an all-dielectric self-supporting cable suspended at an earthed suspension region thereof in an electric field from a tower, wherein an electrically conductive device is connected to said cable remote from said region and means for defining a current path having an arc gap is connected between said device and said earthed region, wherein said arc gap is defined between an electrically conductive annular first member and an electrically conductive elongated second member.

11. A method for limiting dry band arcing adjacent an earthed suspension region of an all-dielectric self-supporting cable suspended from a tower comprising directing current along a current path including an arc gap rather than along the surface of the cable when dry band arcing at a current above a predetermined value would otherwise occur, wherein said arc gap is defined between an electrically conductive annular first member and an electrically conductive elongate second member.

* * * * *

UNITED STATES PATENT AND TRADEMARK OFFICE
CERTIFICATE OF CORRECTION

PATENT NO.     : 6,344,614 B1
DATED          : February 5, 2002
INVENTOR(S)    : Ralph Sutehall et al.

It is certified that error appears in the above-identified patent and that said Letters Patent is hereby corrected as shown below:

<u>Column 4,</u>
Line 34, "filed" should read -- field --.
Line 45, delete "or 2".

<u>Column 6,</u>
Line 10, "elongate" should read -- elongated --.

Signed and Sealed this

Twenty-third Day of July, 2002

*Attest:*

*Attesting Officer*

JAMES E. ROGAN
*Director of the United States Patent and Trademark Office*